Aug. 30, 1955  A. G. FORBES  2,716,313
GAUGE CLAMP
Filed Feb. 25, 1954
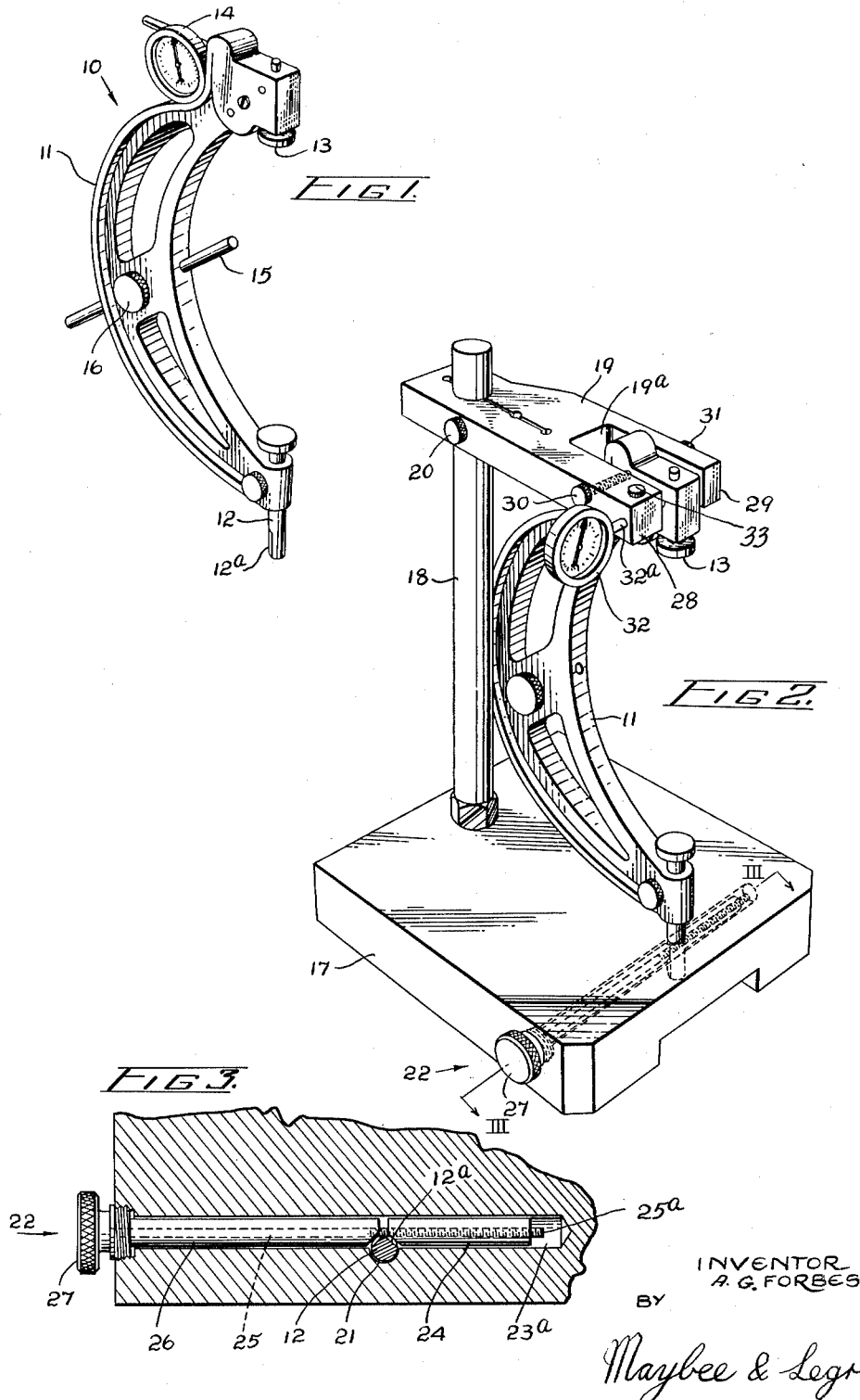
INVENTOR
A. G. FORBES
BY
Maybee & Legris
ATTORNEYS

United States Patent Office 2,716,313
Patented Aug. 30, 1955

2,716,313

GAUGE CLAMP

Aubrey Glanville Forbes, Toronto, Ontario, Canada, assignor to A. V. Roe Canada Limited, Malton, Ontario, Canada, a corporation Application February 25, 1954, Serial No. 412,456

5 Claims. (Cl. 51—217)

This invention relates to a non-distorting gauge clamp for use in the inspection and re-alignment or adjustment of gauges and other like measuring devices.

Dimension-checking gauges and other like instruments that are used in engineering workshop practice for checking the accuracy of manufactured parts or tools must be inspected periodically to ensure that they retain dimensional accuracy. For inspection, and for such re-alignment or other adjustment as may be necessary, the gauges must be properly secured in suitable clamping apparatus while the necessary operations, such as the grinding of worn surfaces, are being carried out.

It is essential that a gauge be held quite rigidly while it is being inspected and adjusted and it is also essential that the clamping apparatus should not distort or deflect the gauge, for if any change in dimensions or alignment is caused by the clamping apparatus, the subsequent operations will be subject to error to that extent.

The main object of this invention is therefore to provide a gauge clamp in which a gauge or like device can be clamped rigidly without altering the dimensions or alignment of parts of the gauge.

Another object of the invention is to provide a gauge clamp which will immediately indicate any distortion or deflection it may cause and which may be adjusted to eliminate such distortion or deflection.

These objects are attained by the invention as disclosed in the following description and accompanying drawings.

In the drawings—in which each reference character denotes the same part in all the views—

Fig. 1 is a perspective view of a conventional snap guage of the type which the clamping apparatus according to the invention is designed to hold, Fig. 2 is a perspective view of the clamping apparatus with the dial snap gauge held therein, and Fig. 3 is a section on an enlarged scale in the plane III—III in Fig. 2 showing the anvil clamp in the base.

The snap gauge 10 of conventional construction shown in Figure 1 consists of a gauge frame 11 supporting a fixed anvil 12 at one end and a movable anvil 13 at the other. Movement of the anvil 13 is indicated on a dial gauge 14 which is removably attached to the snap gauge frame 11; this dial gauge is removed before the snap gauge 10 is placed in the clamp according to the invention. An adjustable rod 15, normally secured in position by a screw knob 16, prevents overtravel of the gauge when the gauge is in use; it may also be removed when the snap gauge is placed in the clamp.

In Fig. 2 the clamp according to the invention is shown holding the snap gauge ready for inspection and adjustment; the clamp includes a base member 17 supporting a cylindrical standard 18 on which a clamping head 19 slides vertically to permit vertical adjustment of the frame; the frame may be fixed at the desired height by a locking screw 20 extending through the side of the frame 19 to engage the standard.

An accurately drilled vertical hole 21 is provided in the base 17 to receive the projecting end of the anvil 12 of the snap gauge, and it co-operates with an internal vise 22 to secure the anvil in a vertical position in the base 17; the vise 22 operates in a horizontal drilled hole 23a intersecting the vertical hole 21 in the base, and it includes a movable jaw 24 internally threaded to engage the threaded end 25a of a rotatable rod 25; a sleeve 26 on the rod 25 acts as a second jaw, and the anvil 12 of the snap gauge may be engaged between the jaws 24 and 26 and forced into contact with the wall of the vertical hole 21 by rotation of the knurled knob 27 secured to the end of the rod 25. The adjacent ends of the jaws 24 and 26 are chamfered and the anvil 12 may have flattened surfaces 12a engageable by the ends of the jaws.

When the anvil 12 is securely held in the vise 22, the upper end of the snap gauge is disposed within a slot 19a between arms 28 and 29 on the clamping head 19; the arms are spaced apart sufficiently to leave some space on both sides of the gauge frame. Set screws 30 and 31 are threaded in the arms of the clamping head and extend into the slot 19a; they can be tightened until their ends engage the side faces of the gauge frame 11. A dial gauge 32 may be horizontally mounted at the side of the clamping head with its anvil 32a arranged to extend through a hole in the arm 28 so as to project resiliently into the slot 19a and to touch the nearer side face of the gauge frame. In this position, the dial gauge 32 will measure the degree of deflection from the vertical of the gauge frame. The dial gauge 32 may be secured in place by a locking screw 33.

*Operation*

The gauge to be inspected is held in an upright position over the base member 17 and the projecting end of the fixed anvil 12 at the bottom of the gauge is inserted in the vertical hole 21 where it is secured by rotating the narrow knob 27 to operate the vise 22. In this position, the upper end of the gauge frame 11 is disposed in the slot 19a in the clamping head 19. The set screws 30 and 31 must be sufficiently withdrawn to avoid contact with the side faces of the gauge frame. The deflection-measuring dial gauge 32 is adjusted in the hole in the arm 28 with its anvil 32a touching the nearer side of the gauge frame and the dial gauge 32 is adjusted to give a reading of zero for that disposition of the parts of the assembly.

The set screws 30 and 31 are then carefully screwed inwardly to cause them to engage evenly the side faces of the gauge frame 11 in such a way that no continuing indication of deflection of the gauge frame is maintained by the dial gauge 32. By carefully advancing the set screws 30 and 31 simultaneously or in turn, any slight deflections which may be caused can be corrected before the maximum degree of tightening is reached. When finally adjusted, the gauge clamp holds the snap gauge very securely, permitting any necessary operations to be performed without distortion.

The foregoing description sets forth the best mode contemplated by the inventor of carrying out his invention, but the following claims are intended to cover all useful changes and modifications of the said mode which are within the scope of the invention defined in them.

What I claim as my invention is:

1. Apparatus of the kind described comprising a support, means associated with the support to hold a snap gauge, arms connected to the support and spaced apart to define a slot, two rigid members extensible toward each other from the arms transversely of the slot, the said members being in longitudinal alignment with each other, a third member projecting resiliently from one arm toward the other arm transversely of the slot, and indicating means operatively connected to the said third member to indicate the distance of projection of the said third member toward the said other arm.

2. Apparatus of the kind described comprising a support, means connected to the support to hold a snap gauge, arms connected to the support and spaced from the said means and spaced apart to define a slot adapted to receive in spaced relationship a portion of the snap gauge, two rigid threaded members each threaded in one of the arms and extensible toward each other transversely of the slot, the said members being in longitudinal alignment with each other and adapted to engage opposite sides of the snap gauge, and a gauge secured to one of the arms and having an anvil resiliently projecting from the said one arm toward the other arm transversely of the slot and adapted to engage the near side of the snap gauge and having indicating means operatively connected to the anvil to indicate the distance of projection of the anvil toward the said other arm.

3. Apparatus of the kind described comprising a support, a vise associated with the support and adapted to secure a snap gauge to the support, a clamping head on the support having arms spaced from the vise and spaced apart to define a slot adapted to receive in spaced relationship a portion of the snap gauge, longitudinally alined set screws each threaded in one of the arms and extensible toward each other transversely of the slot and adapted to engage opposite sides of the snap gauge, and a gauge secured to one of the arms and having an anvil resiliently projecting from said one arm toward the other arm transversely of the slot and adapted to engage the near side of a snap gauge and having indicating means operatively connected to the anvil to indicate the distance of projection of the anvil towards the said other arm.

4. Apparatus of the kind described comprising a support, the support having a hole adapted to receive the fixed anvil of a snap gauge, an anvil-securing vise in the support adapted to secure in the hole the anvil of the snap gauge, a standard secured to the support, a clamping head on the standard having arms spaced above the vise and spaced apart to define a slot adapted to receive in spaced relationship a portion of the snap gauge, longitudinally aligned set screws each threaded in one of the arms and extensible toward each other transversely of the slot and adapted to engage opposite sides of the snap gauge, and a gauge secured to one of the arms and having an anvil resiliently projecting from the said one arm toward the other arm transversely of the slot and adapted to engage the near side of the snap gauge and having indicating means operatively connected to the anvil to indicate the distance of projection of the anvil toward the said other arm.

5. Apparatus of the kind described comprising a support, an anvil-securing vise in the support adapted to secure the fixed anvil of a snap gauge, a clamping head spaced above the support and having arms spaced horizontally apart to define a slot spaced from the vise and adapted to receive in spaced relationship the upper portion of the snap gauge, longitudinally aligned set screws each threaded in one of the arms and horizontally extensible toward each other transversely of the slot and adapted to engage opposite sides of the upper portion of the snap gauge, and a gauge secured to one of the arms and having an anvil resiliently projecting horizontally from the said one arm toward the other arm transversely of the slot and adapted to engage the near side of the upper portion of the snap gauge and having indicating means operatively connected to the anvil to indicate the distance of projection of the anvil toward the said other arm.

References Cited in the file of this patent

UNITED STATES PATENTS

| Number | Name | Date |
|---|---|---|
| 264,877 | Heyer | Sept. 26, 1882 |
| 749,766 | Wilkison | Jan. 19, 1904 |
| 1,937,240 | Odum | Nov. 28, 1933 |